Nov. 17, 1953   W. R. WORKS ET AL   2,659,664
VORTEX RING PROCESS FOR LIQUID-LIQUID EXTRACTION
Filed Aug. 30, 1950   2 Sheets-Sheet 1

INVENTOR.
WILLIAM R. WORKS
FRANK A. M. BUCK
BY
Arnold and Mather
ATTORNEYS

Nov. 17, 1953      W. R. WORKS ET AL            2,659,664
        VORTEX RING PROCESS FOR LIQUID-LIQUID EXTRACTION
Filed Aug. 30, 1950                            2 Sheets-Sheet 2
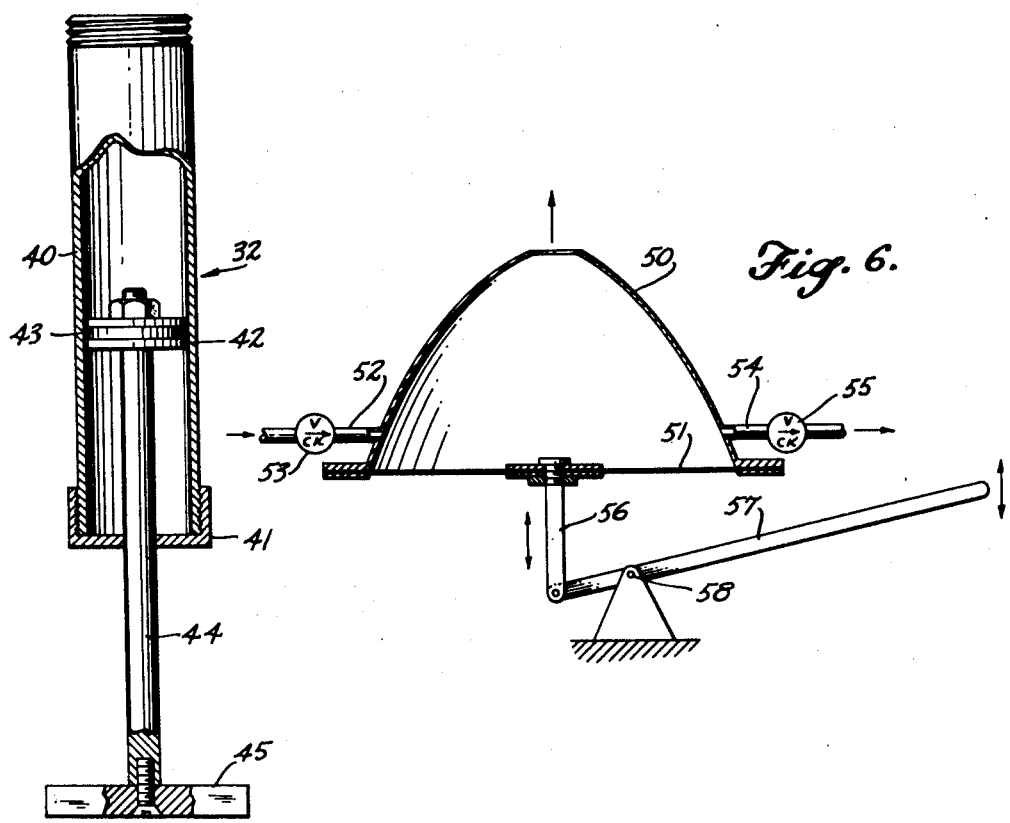
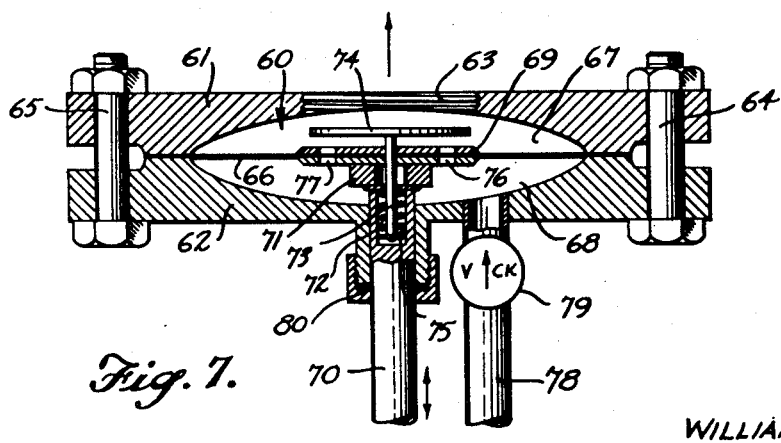
INVENTOR.
WILLIAM R. WORKS
FRANK A. M. BUCK
BY
Arnold 2nd Mathis
ATTORNEYS

UNITED STATES PATENT OFFICE 2,659,664

VORTEX RING PROCESS FOR LIQUID-LIQUID EXTRACTION

William Robert Works, Washougal, Wash., and Frank A. M. Buck, Concord, Calif.

Application August 30, 1950, Serial No. 182,305

5 Claims. (Cl. 23—310)

Our invention relates to a vortex ring process and apparatus for liquid-liquid extraction.

More particularly, our invention relates to the separation or extraction of dissolved matter from one liquid by means of a second liquid and the action of vortex rings, said liquids being at least partially immiscible.

Many types of liquid-liquid extractors have been designed and some create turbulent conditions in order to reduce the mass transfer resistance of a solute from one liquid phase to a second (immiscible) phase.

One of the purposes of our invention is to provide for turbulence (at or near the interface) between the liquids by means of the vortex rings as a means of transferring substances or materials from one liquid to another, and thereby to control the location of such turbulence at the most advantageous point, i. e., the interface between the liquids.

Serious objections obtain to the prior liquid-liquid extracting processes in that such processes are, as a whole, very costly or inefficient. Moreover, such processes, as heretofore employed, are not practically applicable where the difference in density between the liquids is very small. At this point it is our purpose to provide a liquid-liquid extracting process which will achieve what has not been done heretofore as to such cases where the difference in density is small, since our providing for vortex rings involves translational forces which render the separation of the liquids independent of gravity.

Objections, furthermore, obtain to the methods heretofore employed due to the fact that emulsion difficulties are often created by the process itself and very low efficiency obtains in such methods. Moreover, such previously employed processes often require additional coalescing or settling out equipment.

A primary object of our invention is to overcome these various objections. Our invention or discovery involves the projection of one liquid through the other in the form of vortex rings, i. e., a ring of toroid (doughnut shape). The term "vortex rings" as used herein means vortex rings of the toroid form.

By the use of vortex rings we provide for maintaining turbulence in the interface and thereby increase mass transfer rates. The development of such rings reduces, often eliminates, emulsion difficulties and promotes efficient separation of the two liquid phases without additional coalescing equipment.

Thus, the problem briefly stated is as follows: In a liquid A there may be certain dissolved matter X which may be impurities or substances of value or, in part, both. The problem is to remove such dissolved matter from liquid A. This separation we accomplish in our invention by means of a second liquid B through which liquid A with its dissolved X is projected in the form of vortex rings so that liquid B is employed to extract the dissolved matter from liquid A. It will be understood that liquid B is ordinarily chosen, among other factors, primarily for its affinity for the dissolved material X and its ease of separation from X. In some instances it may be advantageous to choose B because of its ease of separation from A. The projection of one of the liquids through the other in the form of said rings thus provides for a very turbulent condition at the interface of the two liquids. Having thus transferred the dissolved matter to liquid B we then have such matter X in a liquid from which, due to its particular characteristics, it may be more readily removed than from liquid A. In cases where the object is to purify liquid A and X is to be discarded, then the ease of separability of X from B is of no importance. It will be understood that liquid B may be the liquid projected through A.

The projection of the one liquid through the other in the form of said rings not only provides for the necessary turbulence at the interface of the two liquids to overcome mass transfer resistance but also serves to translate the said liquid in the form of the vortex ring through the other liquid thereby rendering such translation independent of differences in density, i. e., independent of gravity separation. Such translation force is one contributing feature to the efficiency of our invention.

As for the vortex ring itself, it is interesting to note that a very complete mathematical development of the physical properties of vortex rings in ideal fluid systems has long been made heretofore. It has been urged that the properties of matter might be explained by assuming the atoms to be vortex rings in a hypothetical universal perfect incompressible fluid. This spurred the mathematical development of the properties of vortex rings to the extent that the theory was quite completely worked out by 1880. Quite complete schemes of chemistry based on the vortex ring atom were soon developed and complete mathematical analyses of the properties of vortex rings in said hypothetical medium were published. The ramification of the Bohr atom in chemistry soon stopped this development and because vortex rings had no other significance the research quickly died out and therefore the vortex ring has been for a long time primarily a matter of historical interest.

The term "vortex ring" is used herein to designate a ring of toroid-shaped section of liquid projected in such a manner as to contain very considerable energy of rotation as well as energy of translation. The well-known "smoke ring" is an example of a vortex ring in the gas phase.

Liquid-liquid extraction affords a method of accomplishing many separations which would be either impossible or too costly to perform by other means. It finds application wherever a desired separation is characterized by one or more of the following situations or conditions: (1) Heat sensitive materials are present. (2) Materials are non- or relatively non-volatile. (3) Materials are of the same or substantially the same volatility. (4) The less volatile component is present in small amount.

Although it is usually not possible even in the above cases to perform the complete separation without using distillation, absorption, or stripping to recover either the product or the solvent, liquid-liquid extraction often serves to make the over-all process feasible or more economical. The liquid-liquid extraction has been applied for the recovery of phenols from effluent liquors, for extracting bromine from sea water, for the dehydration of acetic acid, and for the refining of petroleum products, and for the refining of lubricating oils, and the extraction of vanillin by benzene from aqueous solutions. Our process would be applicable to all these uses.

The application to liquid-liquid extraction of absorption and stripping equipment, such as the spray column, packed column, sieve-plate column, has been associated with the petroleum industry. Spinner and other internally agitated columns have been developed to meet the more difficult mass transfer problems encountered in condensed systems. These columns function by creating artificial turbulence which reduces the resistance to transfer. One object of our invention is the use of vortex rings in place of drops in a spray and other forms of columns for the purpose of creating turbulence and increasing mass transfer rates.

Because of the rotation, vortex rings have many properties which are of advantage in liquid-liquid extraction. The rotation of the ring makes its shape stable as the result of the conservation of energy. This same rotation causes a high internal turbulence within the vortex ring and high interfacial velocity between the ring and the continuous phase.

Further, since a vortex ring is projected and therefore has translation force through the continuous phase without primary reliance on buoyant force because of density differences, this is a useful tool in performing extraction where little difference in density exists. The stability of form and kinetic energy of translation of the vortex ring allows it to be used to contact two liquids which differ only slightly in density. For example, the extraction of impurities from aniline ($d=1.022$ g./ml.) with water is impractical with ordinary equipment because of the extremely low capacity necessitated by the slight difference in density.

Also, according to the film theory of mass transfer, higher velocities between the phases reduces the film thickness and so reduces the resistance to transfer. The interfacial velocity attained in most liquid-liquid processes and equipment is very low and the vortex ring has decided advantages from this point of view.

A further advantage is the high internal turbulence existing in vortex rings which reduces the internal resistance to mass transfer. Good mixing and low internal film thickness occurs in vortex rings because of the change in cross section for flow as a particle revolves within the vortex ring, as well as the high velocity and consequent turbulence from that consideration.

In addition to the advantages set forth above, equipment of our invention provides for extraction whereby utilization of the vortex rings results in less tendency to bothersome emulsions than equipment of the mixer-settler type. Operated properly in the manner of the spray tower, the advantages of true countercurrent operation are attained.

In connection with gravity separation, as employed in liquid-liquid extracting processes commonly employed, we may consider three situations by way of comparison, as follows:

1. Where sufficient difference in densities of the two liquids is present to cause the gravity separation to take place in efficient capacity; the projection of one liquid through the other in the form of toroid rings of our invention would give still greater capacity because of the additional translational force and this translational force ordinarily would be employed to act in the same direction as gravity. This means that the direction may be up or down in the column. In fact, such force may be horizontally directed in our invention or in an opposite direction to the force of gravity, and thus our invention provides for still greater latitude than is present in processes heretofore employed.

2. Where a slight difference in densities of the two liquids is present; here the gravity separation would involve low capacity. In this instance, of course, the increased advantage of the toroid rings of our invention is much greater.

3. Where the difference in densities of the two liquids is such that it is reversed between the top and the bottom of a column due to the extraction which causes the liquids to progressively acquire the same densities as in the illustration above of the aniline case; in this third situation the toroid rings render the extraction possible which otherwise is not possible because the translational force of our invention carries the one liquid through the other despite gravity. Moreover, such translation force of the liquid in the form of the toroid ring may be regulated to provide the desired capacity. Be it further noted that even the greater force comparable to gravitation of a centrifugal apparatus would be ineffective in this third situation because in the centrifugal device dependence is had upon the difference in densities of the two liquids.

The following may be cited as examples of our invention where the toroid rings have been projected upwardly:

A. Carbon tetrachloride (CCl4) ($d=1.595$ g./ml.) in water,
B. Benzene ($d=0.879$ g./ml.) in water, and
C. Aniline ($d=1.022$ g./ml.) in water.

In A and C examples, the projection would normally be downwardly, because of the densities involved.

As illustrative of the potency of the vortex ring of our invention in maintaining its ring form or integral unity of the ring while passing through a second liquid, the following example is used as an exemplification of this potency:

We have projected colored water rings through plain water. The rings persisted through the column. We have discovered that we can maintain the form of the ring for an extended distance through another liquid—such distance may be in the order of several feet. The high rotative velocity of the liquid in the form of a ring maintains its form and presents a continued exposure of the liquid which is forming the ring to the second liquid through which it passes. This accounts for much of the efficiency of the separation of impurities from the one liquid by the second liquid.

A suitable apparatus (a) for the production and launching of the vortex rings, where the vortex rings are formed of the light liquid, (b) for the introduction of the heavy liquid as the continuous medium for translation of the vortex rings, (c) for the removal of both liquids is set forth in the drawings. For purposes of definiteness of description and illustration the disclosure is set forth as respects a specific application. In this particular application the light liquid A is the liquid employed to form the vortex rings. However, it is to be distinctly understood that this is only a specific illustration of use of the apparatus. It will be definitely understood, of course, that where the heavy liquid is to be projected that the vortex rings could be launched from above downwardly through the column and that where the densities are very close or the difference in densities reverse during the extraction the rings could be launched horizontally into a horizontal column.

The above mentioned general objects of our invention, together with others inherent in the same, are attained by the mechanism illustrated in the following drawings, throughout which like reference numerals indicate like parts:

Fig. 5 is a view in section of the piston form of pump or vortex ring forming means of our invention by which the vortex rings may be launched in said above mechanism;

Fig. 6 is a schematic drawing of a modified form of pump or vortex ring forming means by which said vortex rings may be launched in said above mechanism; and Fig. 7 is a view of a further modified form of vortex ring forming means of our invention by which said vortex rings may be launched in said above mechanism.

Figure 1:
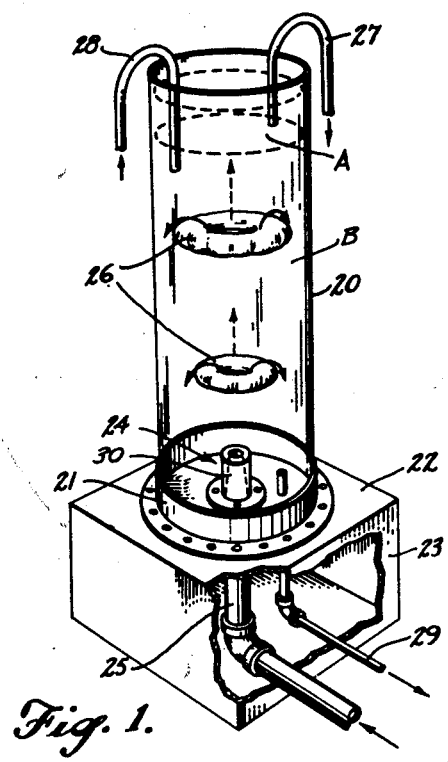
Figure 1 is a cut away view in perspective of that part of the mechanism of our invention in which one liquid is confined and through which the vortex rings are launched and translated.

With reference to the drawings, a glass tube 20 of some nine inches in diameter to function as a column was mounted in a soft lead collar 21 peened against the tube and sealed. The lead collar was secured to a brass plate 22 mounted on top of a box 23. Nozzle holding assembly 24 was sealed liquid tight to the brass plate 22 and connected to inlet pipe 25 which was the admission pipe for liquid A which pipe was connected to the impulse pump to be described hereinafter. In the specific application herein set forth liquid A is the light liquid and the one introduced in the form of vortex rings 26. In this liquid A may be a dissolved material or substance X which it is desired to extract. A pipe 27 is provided to drain off the liquid A (raffinate phase) after the same reaches the top of the tube. The heavier liquid B is introduced by pipe 28 and is drawn off as the extract phase at the bottom by outlet pipe 29. The nozzle 30, shown in dotted line in Fig. 1, was secured to the nozzle assembly 24, see Fig. 3. The upper part of the nozzle assembly has internal threads 31 to provide for different forms of nozzles as may be desired for the particular liquids or purposes involved.

Figure 2:
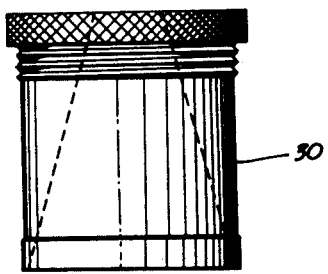
Fig. 2 is an enlarged view in section of one form of discharge nozzle.

In Fig. 2, a nozzle two inches long with an internal base diameter of one and six-tenths inches and extending to a one-half inch top opening with the converging walls of the order of 30° included angle is shown and represents a nozzle with which we reproduced vortex rings.

Figure 4:
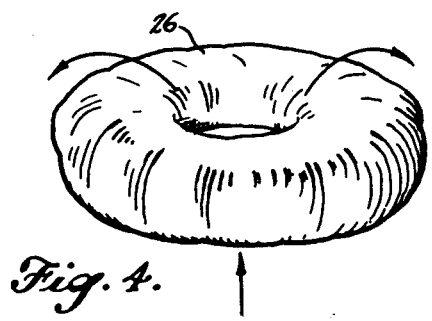
Fig. 4 is a view in perspective of a liquid vortex ring.

In Fig. 4 the liquid vortex ring is illustrated of toroid or doughnut shape. The liquid revolves in the direction of the arrows, i. e., from the inside to the outside of the ring in the direction of translation.

The piston form of pump or vortex ring forming means 32 (see Fig. 5) comprises a cylinder 40 with a cap 41, a piston 42 having leather washer 43 mounted on rod 44 provided with a handle 45—in short a common and well known form of piston pump. The rod 44 passes through cap 41. This constitutes a simple form of impulse providing means for launching the vortex rings 26. The liquid A was supplied to the cylinder 40 and this was then attached to pipe 25. A sudden sharp blow or thrust on the handle 45 of rod 44, produced a ring 26.

The modified form of pump or vortex ring forming means 50 (see Fig. 6) was formed from an A. C. ordinary fuel pump, such as was used on a model 1935 Chevrolet automobile. It comprised a pumping chamber 50 having a diaphragm 51. An inlet conduit 52, having check valve 53, leads into one side of said pumping chamber and outlet conduit 54, having outlet check valve 55, leads off from the opposite side. A link 56 connects the central portion of said diaphragm to lever 57 fulcrumed at 58. The conduit 54 connects with inlet conduit 25. Thus, when the pumping chamber is filled with the liquid A to be employed in forming the vortex rings and check valve 53 is closed and outlet check valve 55 opened, a sudden sharp downward thrust on lever 57, forces upwardly the diaphragm 51 and a vortex ring is launched from the nozzle 30 and into the heavier liquid B in glass tube 20. In filling pumping chamber 50 with the inlet check valve 53 opened and outlet check valve 55 closed, the lever 57 was moved (as to its outer end) upwardly to draw down the diaphragm and thus enlarge the pumping chamber and suck in liquid from the inlet conduit 52. This device is the above identified Chevrolet pump with the omission of the coil spring there used to operate the diaphragm in discharging the contents of the pumping chamber. The reason for the removal of said coil spring was that it would not provide the sharpness of thrust necessary to launch the vortex rings. Furthermore, one of the short levers in said identified pump was omitted and the lever 57 represents one of the levers extended to increase the mechanical advantage.

In the modified form of our invention shown in Fig. 7 a pumping chamber 60 is formed between two hollowed out plates 61 and 62 with an exhaust outlet 63 which may be connected to pipe 25 with its nozzle 30. These plates are held together by bolt and nut assemblies 64 and 65. Clamped between plates 61 and 62 is flexible diaphragm 66 supporting in its central portion a plate 69 mounted on a rod means 70 with its enlarged member 71. This diaphragm 66 divides chamber 60 into an upper chamber 67 and a lower chamber 68. The upper part of rod 70 is hollowed out to accommodate a spring 72 mounted on stem 73 of valve member 74. Stem 73 has a base plate 75 against which the spring bears. In plate 69 there are a plurality of ports, such as 76 and 77. Inlet conduit 78 with check valve 79 leads into pumping chamber 68. Rod 70 passes through a packing gland 80.

The operation of this form of pump is as follows: To fill the top chamber 67 rod 70 is pulled downwardly allowing spring 72 to hold upwardly the valve member 74 so that ports 76 and 77 will open and the liquid in 68 can flow upwardly into chamber 67, since check valve 79 will have been closed after filling the lower chamber 68. Then, the direction of the rod 70 is reversed and sharply and suddenly actuated upwardly thereby permitting valve 74 to close ports 76 and 77 and causing the liquid to be suddenly thrust out of or discharged from the exhaust port 63 to the nozzle 30 through conduit 25 thereby launching the vortex rings. At the same time upon the upward thrust of rod 70, the chamber 68 is resupplied with liquid as the upward thrust of the diaphragm 66 would cause suction which would open check valve 79.

OPERATION

By way of illustrating specifically the operation of the toroid rings in liquid-liquid separation, a concrete example is herewith set forth wherein benzene functioning as liquid A (i. e., the liquid used in forming the vortex rings) and containing dissolved matter, such as acetic acid, is employed by way of illustrating the efficiency of the process of liquid-liquid separation by toroid rings. In this instance water is used as the second liquid or liquid B.

Benzene with acetic acid dissolved therein has been used very extensively to test the extraction efficiency of various liquid-liquid extraction equipment—water being the second liquid hereinabove identified as B. Acetic acid is extractable from benzene by reason of its solubility in water. According to our invention, the benzene with the acetic acid dissolved therein may be injected through the water in the form of vortex rings. The exposure of the benzene with the acetic acid therein to the water at the whirling interface permits the water to absorb a substantial percentage of the acetic acid and leave the residual benzene free to continue on its way to the top of the water column. By means of our invention we have found that such dissolved matters may be efficiently removed to a high degree. Various percentages of the acetic acid may be extracted by varying the length of the column.

Of course, the limit of such length of column is determined by the translational force imparted to the ring at the time of its forming and launching.

The effectiveness of our invention is illustrated in comparison to the extraction efficiency of drops by the table hereinafter shown.

Figure 3:
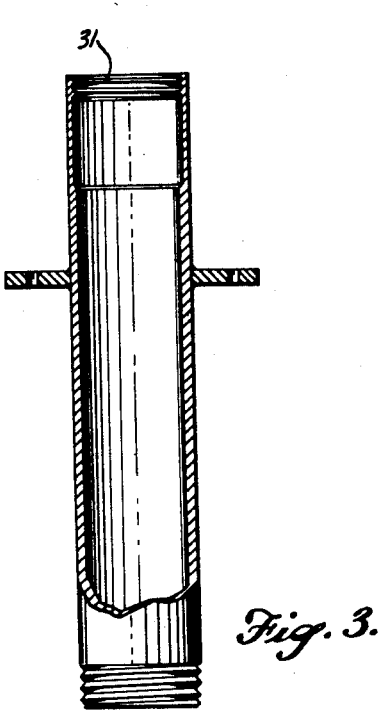
Fig. 3 is an enlarged detailed view of the nozzle holding part of said mechanism.

In providing for the drops a spray tower was constructed as follows: A plate with five 0.10-inch diameter holes to act as spray nozzles was made to screw into the nozzle holder 24 (Figs. 1 and 3). With this attachment the operation of this spray tower, using a perforated plate to form drops could be compared with its operation using vortex rings. With this perforated plate attachment in place of the nozzle, the glass tube was converted to a spray tower for the production of drops and thus the operation of the tower could be readily compared with this operation where vortex rings were employed. Of course, in the production of the drops there is no employment of pulsation. A steady flow was used rather than sharp impulses.

Thus, provision was made for comparing the vortex rings in liquid-liquid extraction in a benzene-acetic acid-water system with that of a spray tower or drop producing tower for the same system and conditions, i. e., the same feed concentration, the same depth of water in the tower, and the same order of magnitude of feed rate. By extracting the acid from a small amount of benzene by a large amount of water, in which it is more soluble, it was possible to neglect the equilibrium concentration of the acid in the water and to use a single batch of water for each run. The benzene was fed into this batch of water through a nozzle of 30° included angle and one-half inch diameter orifice to form the vortex rings. The necessary impulse was provided by operating the modified fuel pump, Fig. 6, sharply at intervals of about two seconds.

The first step in making a run was to prepare a quantity of feed of approximately the desired acid concentration from technical grade benzene and glacial acetic acid. The tower was then emptied and the pump and nozzle system washed out with alcohol and dried with air. A small portion of the feed benzene was then used as a rinse in the pump and nozzle assembly. At this point the nozzle was inserted into the holder and feed benzene pumped in until the whole assembly was full to the nozzle opening. A sample of feed was then pipetted from the nozzle and the nozzle refilled. Means (in this instance a cork) was next placed in the nozzle to prevent interaction between the two phases until the run was actually started, after which the tower was filled with tap water to a level twelve inches above the nozzle outlet. Water temperature was maintained at 20° C., plus or minus 2°, for all runs.

The run was started by commencing to pump; whereupon the pressure on the cork dislodged it allowing it to float out of the way. As the run progressed, data on the number of rings formed, elapsed time, approximate amount of extraneous droplets, and other information were recorded. After 100 rings had been formed, the pumping was stopped and the cork reinserted in the nozzle with the aid of a small rod so that no further interaction could occur between the material left in the nozzle and what was in the tower.

Samples were taken of the benzene layer at the end of the run. After said samples had been taken, the tower was drained, the cork removed from the nozzle, and another feed sample taken from the nozzle holder 24. All samples were then titrated to the phenolphthalein end point with standard base.

After each run in the tower using vortex rings, the nozzle was replaced by the one for forming spray droplets. An identical run was then made except that the pump was disconnected and the benzene arranged to feed by gravity. The rate of feed was controlled by a screw clamp placed on a section of transparent plastic tubing, commonly known as "Tygon" tubing. The results of the runs are set forth in the following table:

*Comparison of effectiveness of vortex rings with spray droplets*

| Run | Tower Setup | Benzene Flow Rate, Cubic Feet per Hour | Concentrations pound mols acetic acid per cubic feet of benzene | | Percent Extraction | H. T. U.,[1] ft. | Estimated percent of feed in form of stray drops |
| --- | --- | --- | --- | --- | --- | --- | --- |
| | | | Feed | Raffinate | | | |
| 1 | Rings | 0.645 | 0.00602 | 0.00224 | 62.9 | 1.04 | 20 |
| | Drops | 0.317 | 0.00602 | 0.00368 | 38.9 | 2.03 | |
| 2 | Rings | 0.615 | 0.00420 | 0.00145 | 65.4 | 0.95 | 22 |
| | Drops | 0.470 | 0.00420 | 0.00253 | 41.9 | 1.96 | |
| 3 | Rings | 0.645 | 0.00505 | 0.00217 | 57.0 | 1.18 | 17 |
| | Drops | 0.320 | 0.00505 | 0.00307 | 39.2 | 2.07 | |
| | Drops [2] | 0.622 | 0.00505 | 0.00382 | 24.4 | 3.61 | |

[1] H. T. U. = height of transfer unit.
[2] Drops formed by one-half inch nozzle.

The table shows that in every case the per cent solute reduction was greater with the vortex rings than with the spray or drop method. The height of a transfer unit for the spray or drop tower was about twice that of the tower using vortex rings.

Part of run No. 3 consisted of pumping the benzene through the one-half inch (½") nozzle in such a manner as not to form rings (see third line in table under run 3) but at approximately the same rate as had been used in forming vortex rings for the first part of the run (see first line). The height of the transfer unit for the tower operated in this manner was 3.61 feet compared to 1.18 feet when rings were formed.

The velocity of rise of the rings in the example was 1.4 feet per second. Incidentally, stray droplets were formed due presumably to imperfections of formations of the rings. The throughput capacity of the vortex ring tower may be limited more by the rate of rise of extraneous droplets.

No trouble was experienced from emulsions in employing the rings of our invention.

It is apparent from considerations herein set forth that the advantage of our invention is of particular importance where extraction is to be made with liquids of little difference in densities. In contrast with such limitations, systems employing the vortex rings of our invention are not limited by any such difference in densities. The velocity of the continuous phase is limited by the velocity of rise of the dispersed phase, and this velocity approaches zero as the densities of the solvent and feed approach each other in the conventional spray, packed, or sieve plate tower.

Another example by way of illustrating the operation of our invention may be set forth employing aniline and water. The extraction of impurities from aniline ($d=1.02$ g./ml.) with water is impractical with ordinary liquid-liquid extraction processes because of the extremely low capacity necessitated by the slight difference in density. The gravity force is manifestly weak in view of the slight difference in density. However, with our invention toroids of aniline may be propelled through the water with ease. The rings are stable as a result of the conservation of energy involved in their angular momentum and the kinetic energy of translation supplied to them from an impulse pump is sufficient to propel the toroids through the continuous phase. In illustrating the difference between our invention and that where only the gravitational force is employed for the separation due to the difference in densities, we may consider the following: Suppose a heavier liquid A contains sufficient X, i. e., dissolved material, to make it lighter than the light liquid B. Thus, conceivably, if the liquid A is introduced at the bottom under ordinary liquid-liquid separation methods, it would gradually lose X as it rose in the column and thus would become heavier than B. Accordingly, by gravity it would fall back towards the bottom of the column. Such would be the case of aniline plus alcohol as an impurity when extraction of the alcohol is attempted by water. But here is where the translational force of the toroid rings of our invention is important because it carries the aniline liquid A through the liquid B even though in the meantime it has been changed to a heavier liquid. Thus, it may be stated in general that this translational force renders our invention independent of change in the liquids between the top and bottom of the column, i. e., independent of gravity.

Thus, our invention by using the toroid rings provides, first, for a better liquid-liquid extraction than occurs in the ordinary liquid-liquid extraction where one liquid is passed through the other in the form of ordinary drops; and, second, better capacity because of the greater translational velocity of one liquid in the form of the rings through the other liquid.

Although vortex rings were formed using nozzle openings as large as one and one-half (1½") inches in diameter, those with openings larger than 0.5 inch in diameter proved useless for practical liquid-liquid extraction operation. When nozzles with openings substantially larger than 0.5 inch were used, the liquid in the tower 20 and that in the nozzle to some degree exchanged places in the intervals between rings under the influence of their difference in density.

A lower limit in nozzle opening diameter also exists which is also practically a constant for all systems studied. All nozzle openings between one and one-half and one-fourth inch in diameter were found to produce vortex rings; but when openings smaller than one-fourth inch were used, the vortex ring formed in tower 20 consisted of both phases. Instead of forming a homogeneous ring, the liquid issuing from the nozzle broke up into five droplets which were suspended in a vortex ring formed from the continuous phase. A nozzle smaller than one-eighth inch in opening diameter employed in apparatus described in the example dispersed the liquid in five droplets which did not form rings at all.

The size of ring formed with a nozzle was found to depend on the diameter of the nozzle but may vary within certain limits depending on the strength of the impulse used to generate the ring. In general, the smallest ring which may be formed with a given nozzle is one whose over-all diameter is the same as the nozzle. This ring has practically no aperture and is formed by a very slight impulse. The largest ring has an aperture of approximately the size of the nozzle and requires much more energy. The larger ring rotates more rapidly and also travels forward more rapidly. It is considerably thinner in cross section than the smaller ring.

Nozzles with an included angle of approximately 30° in the passage leading to the opening were found to produce the best vortex rings. It should be emphasized, however, that the shape of the nozzle is not critical since vortex rings were formed from nozzles ranging in form from long, straight tubes to sharp-edged orifices.

As a test directed primarily to the forming of rings it was observed that vortex rings were formed more readily in aniline-water systems than in water-carbontetrachloride or water-benzene systems. It will be noted that the difference in density between the aniline and the water is very slight, aniline having a density of 1.022 grams per cubic centimeter ($d=1.022$ g./cc.) and water, 0.998. It was also noted in the course of the test that vortex rings of air can be formed and shot through the water in exactly the same manner as other immiscible fluids except that the nozzle opening must be somewhat smaller to hold the air in the nozzle preparatory to forming the ring.

A test conducted with a nozzle having three orifices showed that at least three rings can be formed at one time. No attempt was made to determine the optimum spacing of the nozzle openings. The nozzle shown in Fig. 2 is drawn to scale.

When vortex rings collided with stray drops of the dispersed phase of any considerable size, the rings were broken up. The same thing occurred when a vortex ring touched the side of the column. It was observed that certain effects predicted in the mathematical development of the properties of vortex rings (said calculations being based on an assumed frictionless fluid and no interfacial tension, see text by J. J. Thompson in 1883) were actually observed in our immiscible liquid systems.

Obviously, changes may be made in the forms and arrangement of the parts of our invention, without departing from the principle thereof, the above setting forth only preferred forms of embodiment.

We claim:

1. The process of separating dissolved matter from one liquid by means of a second liquid, said liquids being at least partially immiscible inter se comprising projectingly launching one liquid as a separate body in the form of vortex rings of toroid section through the other liquid while in comparative quiescence whereby said separate body moves as a unit with translational motion through said other liquid and the dissolved matter is extracted in the turbulence maintained in the interface; and removing one liquid from the presence of the other.

2. The process of separating dissolved matter from one liquid by means of a second liquid, said liquids being at least partially immiscible inter se comprising forming a current of one liquid flowing in one direction, projectingly launching the second liquid as a separate body through said first liquid in countercurrent direction and in the form of vortex rings of toroid section with translational motion; and removing one liquid from the presence of the other.

3. In the process of liquid-liquid separation, the step of projectingly launching one liquid as a separate body through the other as the continuous phase in the form of vortex rings of toroid section which separate body moves as a unit with translational motion through said other liquid.

4. The process of liquid-liquid separation comprising the steps in sequence simultaneously (a) forming a separate body of one liquid in a second liquid, (b) imparting to said body rotational forces which cause it to take the form of a vortex ring of toroid section; and (c) forcibly projecting said body as a unit with motion of translation through said second liquid while comparatively quiescent whereby said separate body is provided with maintained turbulence in the interface which increases the mass transfer rates.

5. The process of liquid-liquid separation comprising the steps of sequence simultaneously (a) forming a separate body of one liquid in a second liquid, (b) imparting to said body rotational forces which cause it to take the form of a vortex ring of toroid section; (c) forcibly projecting said body as a unit with motion of translation through said second liquid while comparatively quiescent whereby said separate body is provided with maintained turbulence in the interface which increases the mass transfer rates; and removing one liquid from the presence of the other.

WILLIAM ROBERT WORKS.
FRANK A. M. BUCK.

References Cited in the file of this patent

UNITED STATES PATENTS

| Number | Name | Date |
|---|---|---|
| 744,795 | Reese | Nov. 24, 1903 |
| 800,356 | Briggs et al. | Sept. 26, 1905 |
| 1,384,086 | Poppenhusen et al. | July 12, 1921 |
| 1,907,455 | Stenzel | May 9, 1933 |
| 2,111,360 | Cutting | Mar. 15, 1938 |
| 2,122,457 | Dons et al. | July 5, 1938 |
| 2,196,169 | Twombly | Apr. 2, 1940 |
| 2,205,986 | Mangelsdorf et al. | June 25, 1940 |
| 2,213,798 | Anne | Sept. 3, 1940 |
| 2,430,545 | Wesley | Nov. 11, 1947 |